US008526028B2

(12) United States Patent
Freddi et al.

(10) Patent No.: US 8,526,028 B2
(45) Date of Patent: Sep. 3, 2013

(54) AVOIDING REDUNDANT PRINTING

(75) Inventors: Remo Freddi, Rome (IT); Antonio Mangiacotti, Rome (IT)

(73) Assignee: International Business Machines Corporation, Armonk, NY (US)

(*) Notice: Subject to any disclaimer, the term of this patent is extended or adjusted under 35 U.S.C. 154(b) by 293 days.

(21) Appl. No.: 12/914,282

(22) Filed: Oct. 28, 2010

(65) Prior Publication Data

US 2012/0105894 A1 May 3, 2012

(51) Int. Cl.
*G06K 15/00* (2006.01)

(52) U.S. Cl.
USPC ....... 358/1.14; 358/1.15; 358/1.13; 358/3.26; 358/3.28; 726/5; 726/6; 726/18; 283/902; 380/55

(58) Field of Classification Search
USPC ................. 358/1.1–1.18, 3.26, 3.28; 726/5, 726/6, 21, 17, 32, 18; 705/51, 44, 57; 380/55
See application file for complete search history.

(56) References Cited

U.S. PATENT DOCUMENTS

| 4,179,212 | A  | * | 12/1979 | Lahr ............................. 399/79 |
| 5,949,885 | A  | * | 9/1999  | Leighton ........................ 380/54 |
| 6,578,053 | B1 |   | 6/2003  | Kidokoro et al. |
| 6,700,989 | B1 | * | 3/2004  | Itoh et al. ..................... 382/100 |
| 6,738,491 | B1 | * | 5/2004  | Ikenoue et al. ............... 382/100 |
| 6,952,780 | B2 | * | 10/2005 | Olsen et al. ..................... 726/26 |
| 7,184,571 | B2 | * | 2/2007  | Wang et al. .................... 382/100 |
| 7,253,914 | B2 |   | 8/2007  | Tomita |
| 7,266,215 | B2 | * | 9/2007  | Ikenoue et al. ............... 382/100 |
| 7,304,752 | B2 | * | 12/2007 | Mizuno ........................ 358/1.14 |
| 7,388,965 | B2 | * | 6/2008  | Ikenoue ........................ 382/100 |
| 7,463,752 | B2 | * | 12/2008 | Ikenoue ........................ 382/100 |
| 8,264,707 | B2 | * | 9/2012  | Amorosa et al. ............. 358/1.14 |
| 2003/0182475 | A1 |  | 9/2003  | Gimenez |
| 2004/0138910 | A1 | * | 7/2004 | Matsuno et al. .................. 705/1 |
| 2004/0257613 | A1 |  | 12/2004 | Okabe et al. |
| 2005/0111867 | A1 | * | 5/2005 | Hatano .......................... 399/80 |
| 2006/0098226 | A1 |  | 5/2006  | Morita |
| 2007/0043864 | A1 | * | 2/2007 | Nemoto ........................ 709/225 |
| 2007/0263246 | A1 |  | 11/2007 | Bressan |
| 2008/0297825 | A1 | * | 12/2008 | Hikichi ....................... 358/1.14 |
| 2009/0009797 | A1 |  | 1/2009  | Nimura et al. |
| 2009/0033990 | A1 |  | 2/2009  | Matsugashita |
| 2009/0122351 | A1 |  | 5/2009  | Tsuchitoi |
| 2011/0191770 | A1 | * | 8/2011 | Inoue ........................... 717/178 |

FOREIGN PATENT DOCUMENTS

JP  2002103753 A  4/2002
JP  2004220532 A  5/2004

* cited by examiner

*Primary Examiner* — Twyler Haskins
*Assistant Examiner* — Dennis Dicker
(74) *Attorney, Agent, or Firm* — Garg Law Firm, PLLC; Rakesh Garg; Libby Z. Toub

(57) ABSTRACT

A method, system, and computer usable program product for avoiding redundant printing are provided in the illustrative embodiments. An application executing in a data processing system receives a request to print a document. A determination is made whether a valid shared print of the document is available, the valid shared print being a hard-copy of the document that is currently within a validity period and is available for sharing among multiple entities. The shared valid print is requested from a current owner of the shared valid print. If the request is successful, possession of the shared valid print is changed in a prints repository from the current owner to a new owner and a new printing of the document according to the request to print the document is suspended.

20 Claims, 4 Drawing Sheets

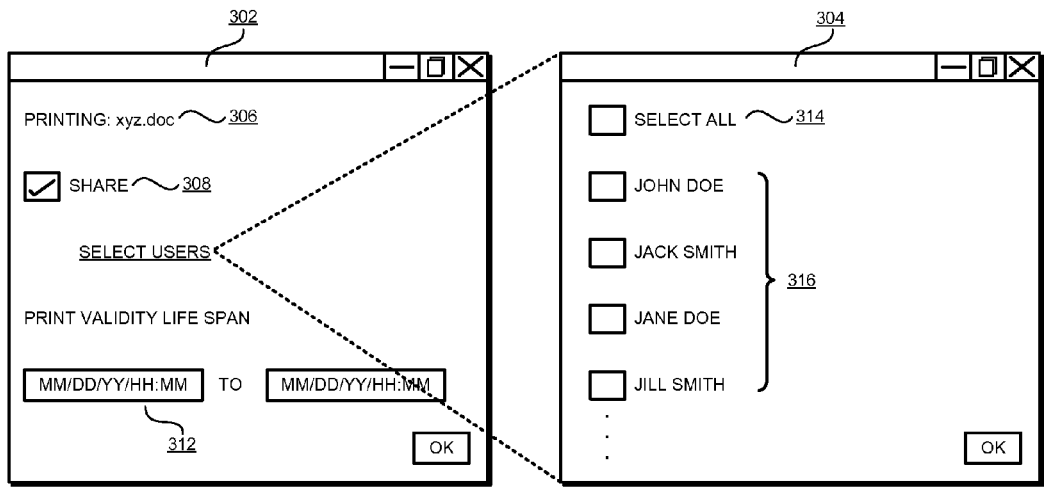

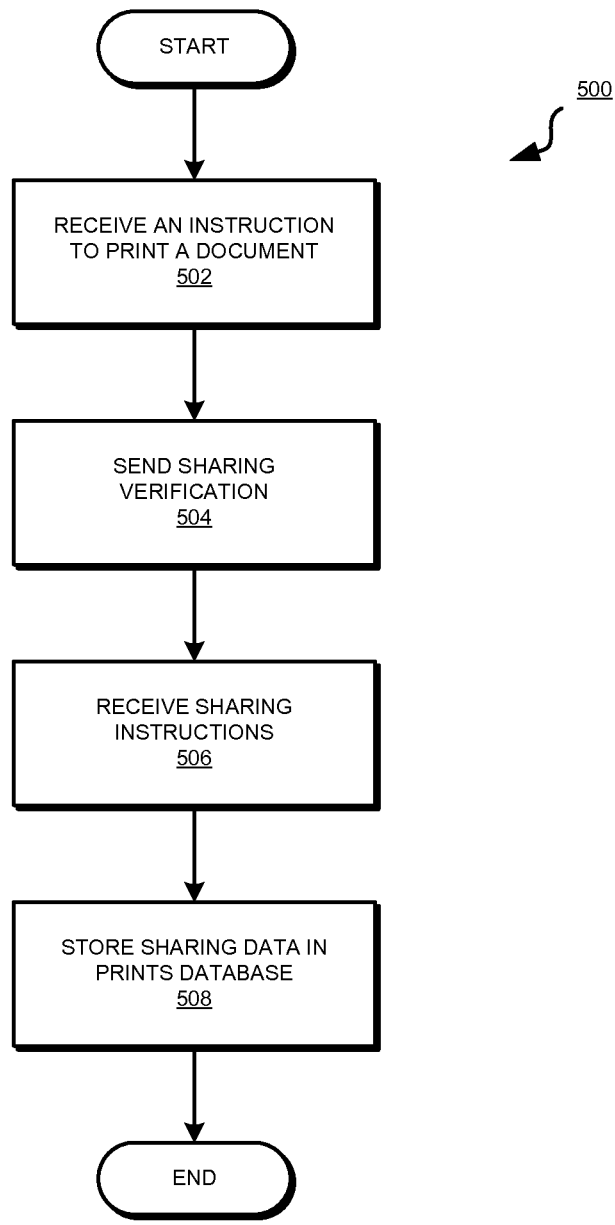

AVOIDING REDUNDANT PRINTING

BACKGROUND OF THE INVENTION

1. Field of the Invention

The present invention relates generally to an improved data processing system, and in particular, to a computer implemented method for conserving printing resources in a data processing environment. More particularly, the present invention relates to a computer implemented method, system, and computer usable program code for avoiding redundant printing in a data processing environment.

2. Description of the Related Art

Even with the effort to become paperless, many data processing environments have to support hard-copy printing. Often, documents are printed without any consideration to other printing activities occurring in the data processing environment.

Often, same documents re-printed and re-printed by the same or different persons without much thought to the existing prints of those documents. This wasteful duplicative printing is particularly apparent in office environments including several persons.

SUMMARY OF THE INVENTION

The illustrative embodiments provide a method, system, and computer usable program product for avoiding redundant printing in data processing environments. An embodiment receives a request to print a document in an application executing in a data processing system. The embodiment determines whether a valid shared print of the document is available, the valid shared print being a hard-copy of the document that is currently within a validity period and is available for sharing among multiple entities. The embodiment requests the shared valid print from a current owner of the shared valid print. In response to the requesting being successful, the embodiment changes a possession information of the shared valid print in a prints repository from the current owner to a new owner and suspends a new printing of the document according to the request to print the document.

BRIEF DESCRIPTION OF THE DRAWINGS

The novel features believed characteristic of the invention are set forth in the appended claims. The invention itself; however, as well as a preferred mode of use, further objectives and advantages thereof, will best be understood by reference to the following detailed description of an illustrative embodiment when read in conjunction with the accompanying drawings, wherein:

FIG. 3 depicts a block diagram of an example sharing verification process for avoiding redundant printing in accordance with an illustrative embodiment;

FIG. 4 depicts an example table of print sharing information for avoiding redundant printing in accordance with an illustrative embodiment;

FIG. 5 depicts a flowchart of an example process of creating a prints database for avoiding redundant printing in accordance with an illustrative embodiment.

DETAILED DESCRIPTION OF THE PREFERRED EMBODIMENT

Figure 1:
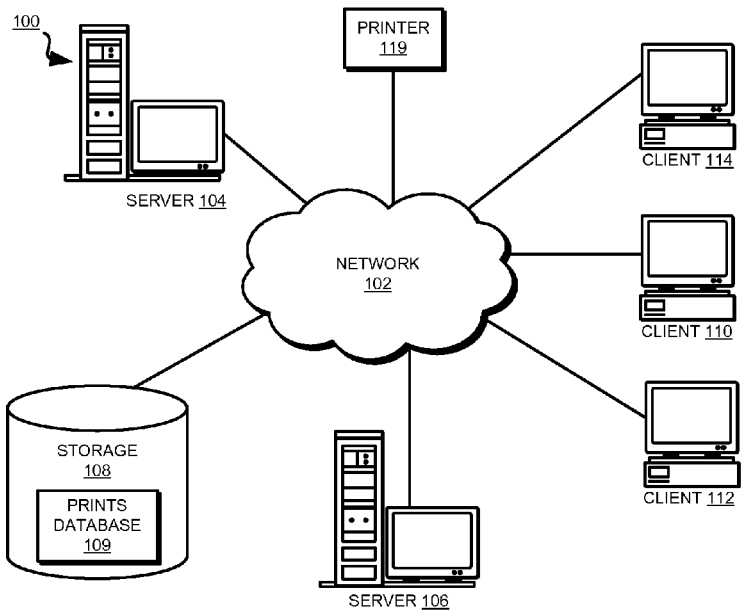
FIG. 1 depicts a pictorial representation of a network of data processing systems in which the illustrative embodiments may be implemented.

Often, a document once printed and used by one user can be reused by another user of the same document.

For example, the invention recognizes that a team may share a set of documents while collaborating on a project. A set of documents is one or more documents. Various team members may wish to print a document from the shared set of documents at different times. In many cases, several members of the team may print the same document, sometimes at the same physical location using the same printer.

The invention recognizes that the duplicate or redundant prints of the same documents waste printing resources and are environmentally unfriendly. The invention further recognizes that often different users need the print of a common document at different times. Accordingly, the invention recognizes that redundant printing of the same document can be avoided with a mechanism to share the existing print of the document.

The illustrative embodiments used to describe the invention generally address and solve the above-described problems and other problems related to duplicative printing. The illustrative embodiments of the invention provide a method, computer usable program product, and data processing system for avoiding redundant printing in a data processing environment. An embodiment of the invention enables a team of user to share an existing print of a document by specifying a print as sharable, determining availability of a sharable print of a document before the document is printed again, and facilitating the sharing of the existing sharable print.

The illustrative embodiments are described with respect to data, data structures, and identifiers only as examples. Such descriptions are not intended to be limiting on the invention. For example, an illustrative embodiment described with respect to single piece of information may be implemented using a combination of several pieces of information, in a similar manner within the scope of the invention.

Furthermore, the illustrative embodiments may be implemented with respect to any type of data processing system. For example, an illustrative embodiment described with respect to a single-processor standalone data processing system may be implemented in a multiprocessor logical partition system, or any other organization of data processing systems, such as rack configurations in a data center, within the scope of the invention. As another example, an embodiment of the invention may be implemented with respect to any type of client system, server system, platform, or a combination thereof.

The illustrative embodiments are further described with respect to certain parameters, attributes, and configurations only as examples. Such descriptions are not intended to be limiting on the invention. For example, an illustrative embodiment described with respect to numeric attribute may be implemented using an alphanumeric attribute, a symbolic attribute, or a combination thereof, in a similar manner within the scope of the invention.

An application implementing an embodiment may take the form of data objects, code objects, encapsulated instructions, application fragments, drivers, routines, services, systems—including basic I/O system (BIOS), and other types of software implementations available in a data processing environment. For example, Java® Virtual Machine (JVM®), Java® object, an Enterprise Java Bean (EJB®), a servlet, or an applet may be manifestations of an application with respect to which, within which, or using which, the invention may be implemented. (Java, JVM, EJB, and other Java related terminologies are registered trademarks of Sun Microsystems, Inc. or Oracle Corporation in the United States and other countries.)

An illustrative embodiment may be implemented in hardware, software, or a combination thereof. The examples in this disclosure are used only for the clarity of the description and are not limiting on the illustrative embodiments. Additional or different information, data, operations, actions, tasks, activities, and manipulations will be conceivable from this disclosure for similar purpose and the same are contemplated within the scope of the illustrative embodiments.

The illustrative embodiments are described using specific code, data structures, file systems, designs, architectures, layouts, schematics, and tools only as examples and are not limiting on the illustrative embodiments. Furthermore, the illustrative embodiments are described in some instances using particular data processing environments only as an example for the clarity of the description. The illustrative embodiments may be used in conjunction with other comparable or similarly purposed structures, systems, applications, or architectures.

Any advantages listed herein are only examples and are not intended to be limiting on the illustrative embodiments. Additional or different advantages may be realized by specific illustrative embodiments. Furthermore, a particular illustrative embodiment may have some, all, or none of the advantages listed above.

Figure 2:
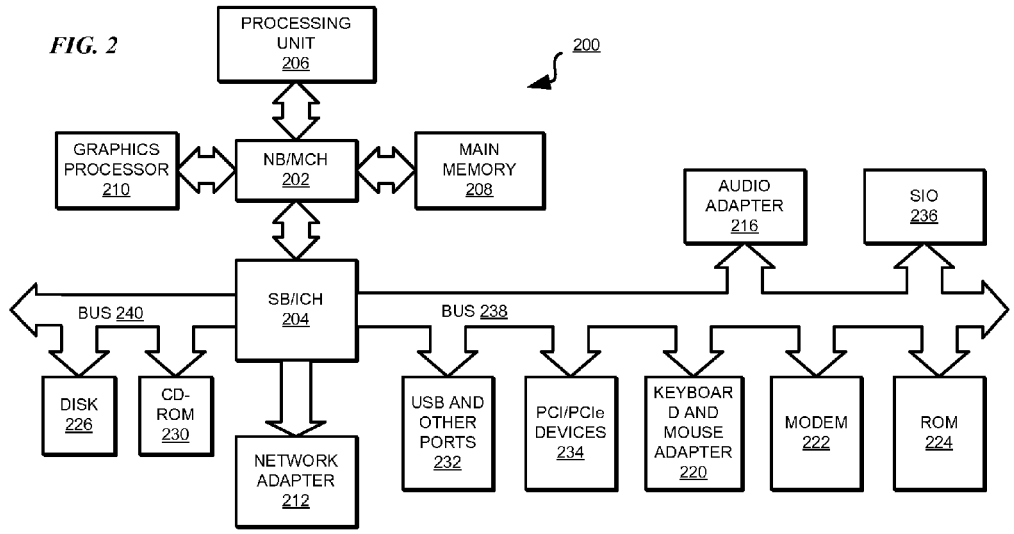
FIG. 2 depicts a block diagram of a data processing system in which the illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a pictorial representation of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Storage 108 may include prints database 109. Prints database 109 may be a data repository of any form or type suitable for storing information about print copies of documents in accordance with an embodiment of the invention. Printer 119 may be a printing device of any kind suitable for producing hard-copy prints of documents of any kind without limitation. Printer 119 may be accessible over network 102 from any data processing system communicating using network 102, such as servers 104 and 106 or clients 110, 112, or 114.

Servers 104 and 106, storage unit 108, and clients 110, 112, and 114 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client server environment in which the illustrative embodiments may be implemented. A client server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, in which computer usable program code or instructions implementing the processes may be located for the illustrative embodiments.

In the depicted example, data processing system 200 employs a hub architecture including North Bridge and memory controller hub (NB/MCH) 202 and south bridge and input/output (I/O) controller hub (SB/ICH) 204. Processing unit 206, main memory 208, and graphics processor 210 are coupled to north bridge and memory controller hub (NB/MCH) 202. Processing unit 206 may contain one or more processors and may be implemented using one or more heterogeneous processor systems. Graphics processor 210 may be coupled to the NB/MCH through an accelerated graphics port (AGP) in certain implementations. In some configurations, processing unit 206 may include NB/MCH 202 or parts thereof.

In the depicted example, local area network (LAN) adapter 212 is coupled to south bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to south bridge and I/O controller hub 204 through bus 238. Hard disk drive (HDD) 226 and CD-ROM 230 are coupled to south bridge and I/O controller hub 204 through bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS). In some configurations, ROM 224 may be an Electrically Erasable Programmable Read-Only Memory (EEPROM) or any other similarly usable device. Hard disk drive 226 and CD-ROM 230 may use, for example, an integrated drive electronics (IDE) or serial advanced technology attachment (SATA) interface. A super I/O (SIO) device 236 may be coupled to south bridge and I/O controller hub (SB/ICH) 204.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java is a trademark of Sun Microsystems, Inc. or Oracle Corporation in the United States and other countries).

Instructions for the operating system, the object-oriented programming system, and applications or programs are located on storage devices, such as hard disk drive 226, and may be loaded into main memory 208 for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in north bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

With reference to FIG. 3, this figure depicts a block diagram of an example sharing verification process for avoiding redundant printing in accordance with an illustrative embodiment. User interfaces 302 and 304 may presented using a data processing system, such as client 110 in FIG. 1, to a user who may desire to print a document.

User interfaces 302 and 304 are depicted as graphical interfaces only as examples for the clarity of the description and are not intended to be a limitation on the invention in either form or function. User interfaces 302 and 304 may be presented in any manner suitable for a particular implementation.

When a user sends a request to print a document, user interface 302 is displayed to the user for creating certain sharing provisions for the print that is about to be created. Interface 302 may present information 306 about the document to be printed, for example, the name of the document, the size of the document, the location or file path of the document, permissions associated with the document of the document, ownership information related to the document, restrictions or confidentiality notices applicable to the document, policies applicable to the document, or any combination thereof.

Interface 302 may further present indicator 308 to specify whether the print that is to be created will be available for sharing with other users. For example, the user printing the document may indicate using a check box, a radio button, a character input, a mouse click, or any other suitable indication that the user intends the print to be available for sharing with other users.

Making the print sharable may depend on policies, restrictions, or other factors. If the print is not going to be sharable for such reasons, indicator 306 may be absent from interface 302, or interface 302 may not be presented at all.

If the print is going to be available for sharing, the user may be able to select other users 310 to whom the shared print will be available. The user may also be able to specify validity period 312 or life span of the print during which the print will be available for sharing. For example, a document may be undergoing revisions and may only be valid until the next revision, which may, for example, be uploaded in fifteen minutes, two hours, or the next day.

For selecting other users 310 to whom the shared print will be available, interface 304 may present certain options. For example, all users within a defined team, organization, or grouping, may be selectable by a single indication, indication 314. Alternatively, users to whom the shared print will be made available may be selected from list 316. As another example way of selecting other users 310, interface 304 may present a listing of specific groups, such as project teams (not shown), a listing of users, or any combination thereof.

Thus, using interfaces 302 and 304, a user can specify whether a print is going to be shared, with whom, and for how long. The information described with respect to interfaces 302 and 304, different or additional information usable for a similar purpose, or a combination thereof, may be selected and presented in any manner suitable within the scope of the invention.

With reference to FIG. 4, this figure depicts an example table of print sharing information for avoiding redundant printing in accordance with an illustrative embodiment. Table 400 may be a prints repository stored in a storage device, such as prints database 109 in storage 108 in FIG. 1.

Essentially, table 400 may provide information about prints of which documents are available for sharing, from which user, to which users. For example, column 402 may provide the names of the documents available for sharing. Column 404 may provide certain characteristics of those documents, such as the sizes of the documents. Any number of characteristics of the documents whose prints are shared. For example, column 404 or an additional column (not shown) may present the privilege level required for the document. As another example, a condition for sharing a document's print, such as requiring a print of another document in return, may be similarly presented.

Column 406 may display the present ownership information about the print. For example, user-1 may have printed the document and may be the owner of the print at one point in time. User-2 may collect the print from user-1 for user-2's use at a second point in time.

Within the scope of the invention, user-2 may borrow the print while user-1 remains the owner at the second point in time and beyond, or user-2 may become the owner of the print at the second point in time. in other words, in one embodiment, only the possession of the print may change and not the ownership, such as in a borrowing transaction. in another embodiment, the possession and the ownership of the print may change. An embodiment may use additional or different columns in table 400 to store the ownership information, the possession information, or both, about a print.

Column 408 may present the validity period of the print. For example, a particular print may be valid from time-1 to time-2, date-1 to date-2, for a specified duration, until a predetermined time or event, or a combination thereof. Column 410 may indicate whether the print is being shared will all, some, or none other users. Column 412 may provide the present location of the shared print.

As some examples, row 414 in table 400 indicates that a print of a document named "xyz.doc" and having a size of 18 Kilo Bytes (KB), presently under the ownership of "John Doe" is available for sharing until Sep. 20, 2010 0800 Hours; the print is available to all users, and is presently located in building 1, floor 6, cubicle 1612. Row 416 in table 400 indicates that a print of a document named "abc.pdf" and having a size of 22 Mega Bytes (MB), presently under the ownership of "Jill Smith" exists but is not available for sharing with anyone. Row 418 in table 400 indicates that a print of a document named "efg.pdf" and having a size of 122 KB, presently under the ownership of "John Doe" is available for sharing until Sep. 22, 2010 1700 Hours; the print is available to users Jane Doe and Jill Smith, and is presently located in building 1, floor 6, cubicle 1612.

Note that the columns and their contents are depicted in table 400 only as examples. Many other document characteristics and sharing related information will be apparent from this disclosure to those of ordinary skill in the art and the same are contemplated within the scope of the invention. Further note that row 416 depicts information about a print that is not sharable only as an option. An implementation may record non-sharable documents, as in row 416, or may omit sharing information of the unshared prints from table 400 without departing the scope of the invention.

With reference to FIG. 5, this figure depicts a flowchart of an example process of creating a prints database for avoiding redundant printing in accordance with an illustrative embodiment. Process 500 may be implemented in an application, such as a printer daemon or spooler, printer device driver, a printer monitoring application, or any other type of application that may be able to detect a printing activity at a data processing system, such as in client 112 in FIG. 1.

Process 500 begins by receiving an instruction to print a document (step 502). Process 500 sends or presents sharing verification interface, such as interface 302 in FIG. 3 (step 504). Process 500 receives sharing instructions, such as the user's inputs on interfaces 302 and 304 in FIG. 3 (step 506). Process 500 stores the sharing data about the print in a prints repository, such as in prints database 109 in FIG. 1 (step 508). Process 500 ends thereafter.

Figure 6:
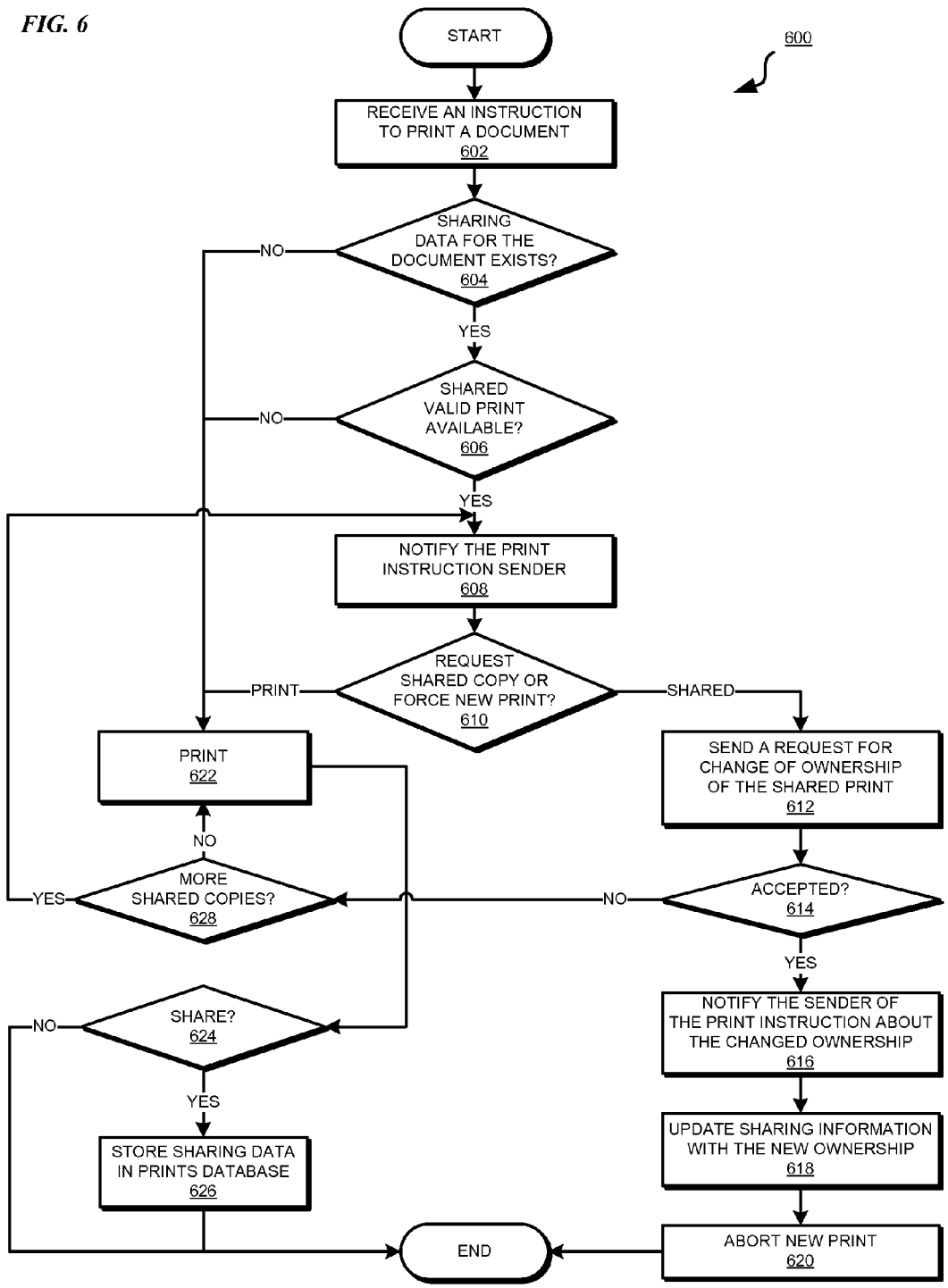
FIG. 6 depicts a flowchart of an example process for avoiding redundant printing in accordance with an illustrative embodiment.

With reference to FIG. 6, this figure depicts a flowchart of an example process for avoiding redundant printing in accordance with an illustrative embodiment. Process 600 may be implemented in an application similar to where process 500 of FIG. 5 may be implemented.

Process 600 begins by receiving an instruction to print a document (step 602). Process 600 determines whether sharing data for the document to be printed exists, such as in a prints repository (step 604).

If sharing data exists ("Yes" path of step 604), process 600 determines whether a shared valid print of the document, to with, a sharable print within the print validity period, is available (step 606). If a shared valid print is available ("Yes" path of step 606), process 600 notifies the sender of the print instruction of step 602 that a shared valid print is available as an option to printing a new hard-copy (step 608).

Process 600 determines, such as based on the sender's response to the notification of step 608, whether the shared copy should be requested from the current owner, or a new print of the document is to be created (step 610). If the shared print is to be requested ("Shared" path of step 610), process 600 sends a request for change of ownership of the shared print to the current owner (step 612).

The current owner may accept the change of ownership request and relinquish control of the print, or may decline the request, such as when the current owner is still using the print. Process 600 determines whether the current owner has accepted the change of ownership request (step 614).

If the request is accepted ("Yes" path of step 614), process 600 notifies the sender of the print request of step 602 about the changed ownership (step 616). Process 600 updates the sharing information of the shared print in the prints repository to reflect the changed ownership (step 618). Process 600 may abort, omit, suspend, or otherwise avoid the new printing that was requested in step 602 (step 620). Process 600 ends thereafter and the sender may procure the existing shared print.

Note that steps 612, 614, 616, and 618 are described with respect to change of ownership as well as possession only as an example and not as a limitation on the invention. Those of ordinary skill in the art will be able to modify these steps in process 600, and process 600 generally to implement only a change of possession, as in a borrowing transaction, without changing the ownership of the print. The borrowing of the print, the changing the possession of the print, the changing the ownership of the print are all contemplated within the scope of the invention.

Returning to step 604, if sharing data for the document whose print is requested in step 602 does not exist ("No" path of step 604), process 600 proceeds to printing the document (step 622). Process 600 determines whether the newly created print should be shared, such as by executing process 500 in FIG. 5 (step 624). If the newly created print is to be shared ("Yes" path of step 624), process 600 stores the sharing information about the print, such as received from process 500 in FIG. 5, in a prints repository (step 626). Process 600 ends thereafter.

If a shared valid print is not available, such as when the current user is using the existing shared print ("No" path of step 606), process 600 proceeds to step 622 and continues there from. Similarly if process 600 has to force a new print even when a shared print is available ("Print" path of step 610), process 600 proceeds to step 622 and continues there from.

If a request for change of ownership of the shared print is declined ("No" path of step 614), process 600 may determine whether more shared copies of the document are available (step 628). Note that a prints repository may hold information about more than one shared copies or unshared copies of the same document, with same of different validity periods and other characteristics.

If process 600 determines that more shared prints of the document are available ("Yes" path of step 628), process 600 returns to step 608 and continues there from. If no more shared prints are available ("No" path of step 628), process 600 proceeds to step 622 and continues there from.

The components in the block diagrams and the steps in the flowcharts described above are described only as examples. The components and the steps have been selected for the clarity of the description and are not limiting on the illustrative embodiments of the invention. For example, a particular implementation may combine, omit, further subdivide, modify, augment, reduce, or implement alternatively, any of the components or steps without departing from the scope of the illustrative embodiments. Furthermore, the steps of the processes described above may be performed in a different order within the scope of the invention.

Thus, a computer implemented method, apparatus, and computer program product are provided in the illustrative embodiments for avoiding redundant printing in a data processing environment. Using an embodiment of the invention, an existing print of a document can be shared among multiple users. An embodiment may allow a change of ownership of the print as a part of the sharing process. Another embodiment may allow a change of possession information only with the ownership of the shared print remaining unchanged, such as in a borrowing transaction involving the shared print. An embodiment enables conservations of printing resources, such as ink, paper, printer components, and may help make a data processing environment more environmentally friendly.

The invention can take the form of an entirely software embodiment, or an embodiment containing both hardware and software elements. In a preferred embodiment, the invention is implemented in software or program code, which includes but is not limited to firmware, resident software, and microcode.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Further, a computer storage medium may contain or store a computer-readable program code such that when the computer-readable program code is executed on a computer, the execution of this computer-readable program code causes the computer to transmit another computer-readable program code over a communications link. This communications link may use a medium that is, for example without limitation, physical or wireless.

A data processing system suitable for storing and/or executing program code will include at least one processor coupled directly or indirectly to memory elements through a system bus. The memory elements can include local memory employed during actual execution of the program code, bulk storage media, and cache memories, which provide temporary storage of at least some program code in order to reduce the number of times code must be retrieved from bulk storage media during execution.

A data processing system may act as a server data processing system or a client data processing system. Server and client data processing systems may include data storage media that are computer usable, such as being computer readable. A data storage medium associated with a server data processing system may contain computer usable code. A client data processing system may download that computer usable code, such as for storing on a data storage medium associated with the client data processing system, or for using in the client data processing system. The server data processing system may similarly upload computer usable code from the client data processing system. The computer usable code resulting from a computer usable program product embodiment of the illustrative embodiments may be uploaded or downloaded using server and client data processing systems in this manner.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer implemented method for avoiding redundant printing, the computer implemented method comprising:
   receiving, in an application executing in a data processing system, a request to print a document;
   determining whether a valid shared print of the document is available, the valid shared print being a hard-copy of the document that is currently within a validity period and is available for sharing among multiple entities;
   requesting the shared valid print from a current owner of the shared valid print;
   responsive to the requesting being successful, changing a possession information of the shared valid print in a prints repository from the current owner to a new owner; and
   suspending a new printing of the document according to the request to print the document.

2. The computer implemented method of claim 1, wherein the changing the possession information also changes the ownership information of the shared valid print, further comprising:
   forcing the new printing to create a new print responsive to one of non-availability of the shared valid print, and requesting the shared valid print being unsuccessful.

3. The computer implemented method of claim 2, further comprising:
   presenting a sharing verification interface for configuring a sharing information for the new print;
   receiving the sharing information for the new print; and
   updating the prints repository with the sharing information for the new print.

4. The computer implemented method of claim 1, further comprising:
   determining whether sharing information about the document exists in the prints repository;
   printing the document to create a new print responsive to the sharing information being one of absent in the prints repository, and the sharing information indicating that an existing print of the document is not shared;
   determining whether the new print will be shared; and
   storing, responsive to the new print being a shared print, sharing information about the new print in the prints repository.

5. The computer implemented method of claim 1, further comprising:
   identifying using the prints repository that a plurality of shared valid prints of the document are available;
   further requesting, responsive to the requesting being unsuccessful, a second shared valid print of the document from a second current owner of the second shared valid print; and
   responsive to the further requesting being successful, changing a possession information of the second shared valid print in the prints repository from the second current owner to the new owner.

6. The computer implemented method of claim 1, wherein the new owner is the sender of the request to print, further comprising:
   notifying the sender that the requesting the shared valid print from the current owner has been successful.

7. A computer usable program product comprising a computer usable non-transitory storage device including computer usable code for avoiding redundant printing, the computer usable code comprising:
   computer usable code for receiving, in an application executing in a data processing system, a request to print a document;
   computer usable code for determining whether a valid shared print of the document is available, the valid shared print being a hard-copy of the document that is currently within a validity period and is available for sharing among multiple entities;
   computer usable code for requesting the shared valid print from a current owner of the shared valid print;
   computer usable code for responsive to the requesting being successful, changing a possession information of the shared valid print in a prints repository from the current owner to a new owner; and
   computer usable code for suspending a new printing of the document according to the request to print the document.

8. The computer usable program product of claim 7, wherein the changing the possession information also changes the ownership information of the shared valid print, further comprising:
   computer usable code for forcing the new printing to create a new print responsive to one of non-availability of the shared valid print, and requesting the shared valid print being unsuccessful.

9. The computer usable program product of claim 8, further comprising:
   computer usable code for presenting a sharing verification interface for configuring a sharing information for the new print;
   computer usable code for receiving the sharing information for the new print; and
   updating the prints repository with the sharing information for the new print.

10. The computer usable program product of claim 7, further comprising:
    computer usable code for determining whether sharing information about the document exists in the prints repository;
    computer usable code for printing the document to create a new print responsive to the sharing information being one of absent in the prints repository, and the sharing information indicating that an existing print of the document is not shared;
    computer usable code for determining whether the new print will be shared; and
    computer usable code for storing, responsive to the new print being a shared print, sharing information about the new print in the prints repository.

11. The computer usable program product of claim 7, further comprising:
    computer usable code for identifying using the prints repository that a plurality of shared valid prints of the document are available;
    computer usable code for further requesting, responsive to the requesting being unsuccessful, a second shared valid print of the document from a second current owner of the second shared valid print; and
    computer usable code for responsive to the further requesting being successful, changing a possession information of the second shared valid print in the prints repository from the second current owner to the new owner.

12. The computer usable program product of claim 7, wherein the new owner is the sender of the request to print, further comprising:

computer usable code for notifying the sender that the requesting the shared valid print from the current owner has been successful.

13. The computer usable program product of claim 7, wherein the computer usable code is stored in a computer readable storage medium in a data processing system, and wherein the computer usable code is transferred over a network from a remote data processing system.

14. The computer usable program product of claim 7, wherein the computer usable code is stored in a computer readable storage medium in a server data processing system, and wherein the computer usable code is downloaded over a network to a remote data processing system for use in a computer readable storage medium associated with the remote data processing system.

15. A data processing system for avoiding redundant printing, the data processing system comprising:
   a storage device, wherein the storage device stores computer usable program code; and
   a processor, wherein the processor executes the computer usable program code, and wherein the computer usable program code comprises:
   computer usable code for receiving, in an application executing in a data processing system, a request to print a document;
   computer usable code for determining whether a valid shared print of the document is available, the valid shared print being a hard-copy of the document that is currently within a validity period and is available for sharing among multiple entities;
   computer usable code for requesting the shared valid print from a current owner of the shared valid print;
   computer usable code for responsive to the requesting being successful, changing a possession information of the shared valid print in a prints repository from the current owner to a new owner; and
   computer usable code for suspending a new printing of the document according to the request to print the document.

16. The data processing system of claim 15, wherein the changing the possession information also changes the ownership information of the shared valid print, further comprising:
   computer usable code for forcing the new printing to create a new print responsive to one of non-availability of the shared valid print, and requesting the shared valid print being unsuccessful.

17. The data processing system of claim 16, further comprising:
   computer usable code for presenting a sharing verification interface for configuring a sharing information for the new print;
   computer usable code for receiving the sharing information for the new print; and
   updating the prints repository with the sharing information for the new print.

18. The data processing system of claim 15, further comprising:
   computer usable code for determining whether sharing information about the document exists in the prints repository;
   computer usable code for printing the document to create a new print responsive to the sharing information being one of absent in the prints repository, and the sharing information indicating that an existing print of the document is not shared;
   computer usable code for determining whether the new print will be shared; and
   computer usable code for storing, responsive to the new print being a shared print, sharing information about the new print in the prints repository.

19. The data processing system of claim 15, further comprising:
   computer usable code for identifying using the prints repository that a plurality of shared valid prints of the document are available;
   computer usable code for further requesting, responsive to the requesting being unsuccessful, a second shared valid print of the document from a second current owner of the second shared valid print; and
   computer usable code for responsive to the further requesting being successful, changing a possession information of the second shared valid print in the prints repository from the second current owner to the new owner.

20. The data processing system of claim 15, wherein the new owner is the sender of the request to print, further comprising:
   computer usable code for notifying the sender that the requesting the shared valid print from the current owner has been successful.

* * * * *